United States Patent
Zhang et al.

(10) Patent No.: US 9,432,268 B2
(45) Date of Patent: Aug. 30, 2016

(54) METHOD AND APPARATUS FOR PLACING SERVICES IN A NETWORK

(71) Applicant: TELEFONAKTIEBOLAGET L M ERICSSON (PUBL), Stockholm (SE)

(72) Inventors: Ying Zhang, San Jose, CA (US); Neda Beheshti-Zavareh, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 276 days.

(21) Appl. No.: 13/751,826

(22) Filed: Jan. 28, 2013

(65) Prior Publication Data

US 2014/0215074 A1 Jul. 31, 2014

(51) Int. Cl.
*G06F 15/173* (2006.01)
*H04L 12/24* (2006.01)

(52) U.S. Cl.
CPC ............ *H04L 41/5045* (2013.01); *H04L 41/12* (2013.01)

(58) Field of Classification Search
CPC ... H04L 43/16; H04L 41/5045; H04L 41/12; H04L 41/0803; H04L 43/0811; H04L 43/0876; H04L 63/107; H04L 12/24; H04L 29/06; H04L 67/1023
USPC ........................................ 709/203, 223, 226
See application file for complete search history.

(56) References Cited

U.S. PATENT DOCUMENTS

| | | | |
|---|---|---|---|
| 7,298,725 B2 * | 11/2007 | Rune ............................ | 370/338 |
| 7,733,913 B1 * | 6/2010 | Cheung et al. ............... | 370/474 |
| 7,860,100 B2 | 12/2010 | Khalid et al. | |
| 8,170,038 B2 | 5/2012 | Belanger et al. | |
| 8,284,664 B1 | 10/2012 | Aybay et al. | |
| 8,339,959 B1 | 12/2012 | Moisand et al. | |
| 8,583,781 B2 * | 11/2013 | Raleigh ......................... | 709/224 |
| 8,817,625 B1 | 8/2014 | Zhang et al. | |
| 2008/0177896 A1 | 7/2008 | Quinn et al. | |
| 2009/0003364 A1 | 1/2009 | Fendick et al. | |
| 2009/0037713 A1 | 2/2009 | Khalid et al. | |
| 2009/0259810 A1 | 10/2009 | Baden et al. | |
| 2010/0148940 A1 * | 6/2010 | Gelvin et al. ............ | 340/286.02 |
| 2010/0165985 A1 | 7/2010 | Sharma et al. | |
| 2010/0226369 A9 | 9/2010 | Havemann et al. | |
| 2010/0303083 A1 | 12/2010 | Belanger et al. | |
| 2011/0055845 A1 | 3/2011 | Nandagopal et al. | |
| 2011/0299419 A1 | 12/2011 | Fendick et al. | |
| 2012/0002672 A1 | 1/2012 | Alexander, Jr. | |
| 2012/0026897 A1 | 2/2012 | Guichard et al. | |
| 2012/0027016 A1 | 2/2012 | Filsfils et al. | |

(Continued)

FOREIGN PATENT DOCUMENTS

| | | |
|---|---|---|
| EP | 1387553 A1 | 2/2004 |
| EP | 2226970 A1 | 9/2010 |
| WO | WO 2012/047885 A1 | 4/2012 |

OTHER PUBLICATIONS

U.S. Appl. No. 13/556,456, filed Jul. 24, 2012, Lefebvre et al.

(Continued)

*Primary Examiner* — Benjamin M Thieu (57) ABSTRACT

Embodiments of the present disclosure include a method and apparatus for placing services in a network. The network and a set of services to be placed within the network are defined. A set of requirements for a plurality of subscribers is determined. Each requirement is a sequence of services to traverse for each subscriber. The services are placed such that a total delay or total distance is minimized for all subscribers.

14 Claims, 9 Drawing Sheets

(56) References Cited

U.S. PATENT DOCUMENTS

| | | |
|---|---|---|
| 2012/0163180 A1 | 6/2012 | Goel |
| 2012/0207174 A1 | 8/2012 | Shieh |
| 2012/0281540 A1 | 11/2012 | Khan et al. |
| 2012/0314573 A1 | 12/2012 | Edwards et al. |
| 2013/0003735 A1 | 1/2013 | Chao et al. |
| 2013/0163594 A1 | 6/2013 | Sharma et al. |
| 2013/0272305 A1 | 10/2013 | Lefebvre et al. |
| 2013/0290955 A1* | 10/2013 | Turner et al. ............. 718/1 |
| 2014/0043977 A1 | 2/2014 | Wiley et al. |
| 2014/0149493 A1* | 5/2014 | Acer et al. ............. 709/203 |
| 2014/0215074 A1 | 7/2014 | Zhang et al. |
| 2014/0241356 A1 | 8/2014 | Zhang et al. |
| 2014/0254374 A1 | 9/2014 | Janakiraman et al. |
| 2014/0269299 A1 | 9/2014 | Koornstra |
| 2014/0334295 A1 | 11/2014 | Guichard et al. |
| 2014/0334488 A1 | 11/2014 | Guichard et al. |
| 2015/0003455 A1 | 1/2015 | Haddad et al. |
| 2015/0081855 A1 | 3/2015 | Zhang et al. |

OTHER PUBLICATIONS

Joseph, D.A. et al. , "A Policy-aware Switching Layer for Data Centers," in Proc. ACM SIGCOMM, Aug. 2008, pp. 51-62.

McKeown, et al. "OpenFlow: Enabling Innovation in Campus Networks", SIGCOMM, Mar. 14, 2008, the whole document.

OpenFlow Switch Specification, Version 1.1.0 Implemented (Wire Protocol 0x02 ), Feb. 28, 2011, the whole document.

Guo et al: Composition Oriented Web Service Semantic Relations Research. Service Sciences (IJCSS), 2011 International Joint Conference on, IEEE, May 25, 2011.

Lee et al. A context-aware service composition scheme for service overlay network. ICT Convergence (ICTC), 2011 International Conference on, IEEE, Sep. 28, 2011.

L. Erran Li et al., "Mosaic: Policy Homomorphic Network Extension", Lux Et Veritas, Yale University Department of Computer Science, May 13, 2010, 15 pages.

Farinacci D. et al., "Locator/ID Separation Protocol (LISP)", IETF RFC 6830, Jan. 2013, 75 pages.

Openflow 1.1 in Hardware: "I was wrong (again)"; Apr. 29, 2011; 3 pages.

A 100 Gig Openflow 1.1 Switch; Powerpoint slide downloaded from the Internet on Apr. 16, 2013; 1 page.

Zhang Y. et al.: "StEERING: A software-defined networking for inline service chaining", 2013 21st IEEE International Conference on Network Protocols (ICNP), IEEE, Oct. 7, 2013, 10 pages.

Quinn P. et al., "Network Service Header"; draft-quinn-nsh-00.txt; Network Working Group; Jun. 13, 2013, 20 pages.

Farinacci D. et al., LISP Traffic Engineering Use-Cases; draft-farinacci-lisp-te-02; Internet Engineering Task Force; Jan. 7, 2013, 24 pages.

Rizzo L. et al.: "Change: Enabling Innovation in the Internet Architecture through Flexible Flow-Processing Extensions", D3.2: Flow Processing Platform Design and Early Implementation, ICT-257422, submission date Sep. 28, 2012, 109 pages.

Qazi Z. A. et al.: "Simple-fying Middlebox Policy Enforcement Using SDN", SIGCOMM, ACM, Aug. 12-16, 2013, Hong Kong, China; 12 pages.

Gibb G. et al.: "Outsourcing network functionality", Hot Topics in Software Defined Networks, ACM, Aug. 13, 2012, Helsinki, Finland; 6 pages.

* cited by examiner

METHOD AND APPARATUS FOR PLACING SERVICES IN A NETWORK

FIELD

Embodiments of the invention relate to the field of networks; and more specifically, to optimal placement of services in a network.

BACKGROUND

Operators use different middlebox services or appliances, called inline services, such as Deep Packet Inspection (DPI), logging/metering/charging/advanced charging, Firewall, Intrusion Detection and Prevention (IDP), Network Address Translation (NAT), etc., to manage subscribers' traffic. These services have high requirements on throughput and packet inspection capabilities. They can be transparent or nontransparent to the end users. Inline services can be hosted in dedicated physical hardware, or in virtual machines.

Service chaining is required if the traffic needs to go through more than one inline service. Moreover, if more than one chain of services is possible, then the operator needs to configure the networking infrastructure to direct the right traffic through the right inline service path. Traffic steering refers to leading the traffic through the right inline service path.

There have been some efforts to determine how to steer traffic to provide inline service chaining. The mechanisms developed through those efforts are designed to explicitly insert the inline services on the path between end-points, or explicitly route traffic through different middleboxes according to policies.

The requirements for any traffic steering solution are: efficiency, flexibility, scalability, and openness. With respect to the efficiency requirement, traffic should traverse middleboxes in the sequence specified by the network operators and should not unnecessarily traverse middleboxes. Great capacity expansion (CAPEX) savings could be achieved if traffic could be selectively steered through or steered away (bypassed) from specific services.

With respect to the flexibility requirement, the framework should support subscriber, application, and operator specific policies simultaneously, all stemming from a single control point. Adding or removing new services should be easily implemented by the network operator.

With respect to the scalability requirement, the framework should support a large number of rules and scale as the number of subscribers/applications grows. The ability to offer a per-subscriber selection of inline services could potentially lead to the creation of new offerings and hence new ways for operators to monetize their networks.

With respect to the openness requirement, deployment of any type of middlebox in the network should be possible. Deployment of the middlebox should be vendor independent in order to avoid vendor lock-in. Further, network operators should be able to leverage their current investment by reusing their existing middleboxes without modifications.

In general, operators use policy-based routing (PBR) to forward subscriber traffic towards the right services. Operators may also use access control lists (ACLs) and virtual local area networks (VLANs) (other tunnelling techniques) to forward packets to the right place.

In some cases, service chaining can be partly performed by the services themselves, leaving less control to the operator over the remaining hops in a service path. In this case, the services must be configured to direct traffic to the next hop in the chain if the service box is not directly connected to the next hop.

Figure 1:
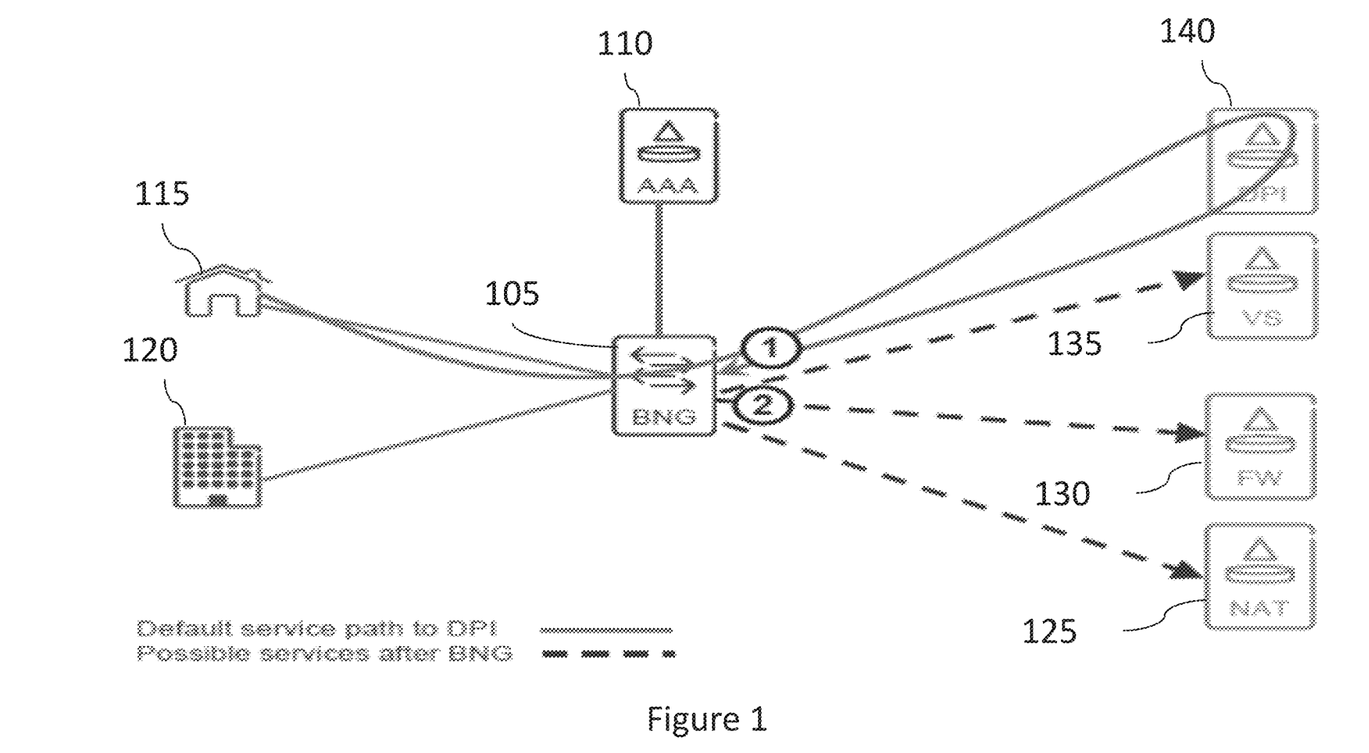
FIG. 1 illustrates an example of inline service chaining.

FIG. 1 illustrates an example of inline service chaining for residential traffic 115 and enterprise traffic 120. In this example, it is assumed that residential traffic will need DPI 140 and NAT 125. Premium residential traffic receives the same services as basic residential in addition to firewall and URL filtering (URL filtering not shown). Enterprise traffic will not require NAT but will need firewall (FW) and virus scanning (VS). In this example, all traffic goes through the DPI 140 and returns to the BNG 105, also shown at point (1) in the FIG. 1. From there (point 2 in FIG. 1) the BNG 105 has to direct the traffic to the right next hop service, e.g., NAT 125, FW 130, VS 135. The subscriber session Authentication, Authorization, and Accounting (AAA) driven policy 110 can define the first hop service; however, this subscriber context information is no longer associated with the return traffic from the DPI 140 at point (1). Hence, determining the next service for a specific flow becomes non-trivial.

One approach to providing services is to use a single box that runs multiple services. This approach consolidates all inline services into a single box and, hence, avoids the need for dealing with inline service chaining configuration of the middleboxes. The operator adds new services by adding additional service cards to its router or gateway.

The single box approach cannot satisfy the openness requirement as it is hard to integrate existing third party service appliances. This solution also suffers from a scalability issue as the number of services and the aggregated bandwidth is limited by the router's capacity. The number of slots in chassis is also limited.

A second approach to providing services is to use statically configured service chains. One or more static service chains is configured. Each service is configured to send traffic to the next service in its chain. A router classifies incoming traffic and forwards the traffic to services at the head of each chain based on the result of the classification.

The statically configured service chain approach does not support the definition of policies in a centralized manner and instead requires that each service be configured to classify and steer traffic to the appropriate next service. This approach requires a large amount of service specific configuration and is error prone. It lacks flexibility as it does not support the steering of traffic on a per subscriber basis and limits the different service chains that can be configured. Getting around these limitations would require additional configuration on each service to classify and steer traffic.

A third approach to providing services is policy based routing (PBR). With the PBR approach a router using PBR is provided. Each service is configured to return traffic back to the router after processing the traffic. The router classifies traffic after each service hop and forwards the traffic to the appropriate service based on the result of the classification. However, the PBR approach suffers from scalability issues as traffic is forced through the router after every service. The router must be able to handle N times the incoming traffic line rate to support a chain with N−1 services.

Finally, a fourth approach to providing services is using a policy-aware switching layer. A policy-aware switching layer for data centers explicitly forwards traffic through different sequences of middleboxes. Using this approach satisfies the efficiency requirement but fails to meet the requirements of flexibility and scalability. Each policy needs to be translated into a set of low level forwarding rules on all the relevant switches. There is no explicit way to configure application related and subscriber related rules separately. They need to be manually consolidated into a set of low level rules. Moreover, this approach requires installing one rule for each new flow. Therefore, it is hard to scale with the number of subscriber/application combinations.

As stated previously, there are multiple schemes used to steer traffic in a network. However, the problem of where to connect services to the network so that total performance is optimized still exists.

SUMMARY

Embodiments of the present disclosure include a method for placing services in a network. The network and a set of services to be placed within the network are defined. A set of requirements for a plurality of subscribers is determined. Each requirement is a sequence of services to traverse for each subscriber. The services are placed such that a total delay or total distance is minimized for all subscribers.

The network can be controlled by a logically centralized controller. The logically centralized controller may be an Open Flow controller.

Placing the services such that a total delay or total distance is minimized can include determining service dependencies for each service. Services of the set of services are placed in a location where delay dependencies of the placed service match most closely with service dependencies of the placed service. Dependencies between each individual service, other services in the set of services, and all ingress points are determined. A dependency ratio is computed by factoring a number of subscribers for a link of a service being placed over a total in degree of the service. The total in degree of the service is computed as the sum of all subscribers' traffic including an ingress point and all other services in the set of services.

In one embodiment, each service is placed iteratively in a location based on an income count of each service. Placing each service includes: computing a dependency ratio; computing a delay ratio; computing a difference between the delay ratio and the dependency ratio for each location pair; determining a sum over all differences; and selecting a location having a least amount of differences. A dependency ratio is computed by factoring a number of subscribers for a link of a service being placed over a total in degree of the service. The total in degree of the service is computed as the sum of all subscribers' traffic including an ingress point and all other services in the set of services. The delay ratio is computed by searching for all non-occupied locations in the defined network; computing a delay between a current location and all other placed services and ingresses; and computing a ratio of the delay over the sum of all delays.

Embodiments of the present disclosure include a centralized controller for placing services in a network. The centralized controller is configured to define the network; define a set of services to be placed within the network; determine a set of requirements for a plurality of subscribers, each requirement being a sequence of services to traverse for each subscriber; and place the services such that a total delay or total distance is minimized for all subscribers. In one embodiment, the centralized controller is an Open Flow controller.

The centralized controller can be further configured to: determine service dependencies for each service; and place services of the set of services in a location where delay dependencies of the placed service match most closely with service dependencies of the placed service. Dependencies between each individual service, other services in the set of services, and all ingress points are determined. A dependency ratio is computed by factoring a number of subscribers for a link of a service being placed over a total in degree of the service. The total in degree of the service is computed as the sum of all subscribers' traffic including an ingress point and all other services in the set of services.

The centralized controller places each service iteratively in a location based on an income count of each service. Placing each service includes: computing a dependency ratio; computing a delay ratio; computing a difference between the delay ratio and the dependency ratio for each location pair; determining a sum over all differences; and selecting a location having a least amount of differences.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for providing optimal inline service placement. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible machine readable medium and transitory machine-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

In recent network architectures, the control plane is decoupled from the forwarding plane and the entire router is built as a distributed system. This is called Software Defined Networking (SDN). A SDN contains a network-wide control platform, running on one or more servers in the network, overseeing a set of simple switches. Traditional router architecture follows an integrated design where the control plane and data forwarding engine are tightly coupled in the same box, which usually results in overly complicated control plane and complex network management. Due to high complexity, equipment vendors and network operators are reluctant to employ changes and the network itself is fragile and hard to manage. This is known to create a large burden and high barrier to new protocol and technology developments.

The SDN network comprises multiple forwarding elements, i.e., switches interconnecting with each other and a small number of controllers that instruct the switches' forwarding behavior.

The main task of a forwarding element, or a switch, is to forward packets from an ingress port to an egress port, according to the rules in the flow table programmed by the remote controller. Each flow entry contains a set of actions such as: forwarding packets to a given port, modifying certain bits in the packet header, encapsulating packets to the controller, or simply dropping the packets. For the first packet in a new flow, the switch normally forwards the packet to the controller to trigger the new flow entry being programmed. The switch can also be used to forward all slow-path packets, e.g., Internet Control Message Protocol (ICMP) packets, to a controller for processing. The concept of a flow can be defined broadly, e.g., a Transmission Control Protocol (TCP) connection, or all traffic from a particular Media Access Control (MAC) address or Internet Protocol (IP) address.

A network controller adds and removes flow-entries from the flow table. The network controller defines the interconnection and routing among the set of data plane switches. The network controller also handles network state distribution, such as collecting information from, and distributing routing instructions to, the switches. The network controller can also be programmed to support any new addressing, routing, and complex packet processing applications. The controller is the "brain" of the network. A switch needs to connect to at least one controller in order to function correctly.

Figure 2:
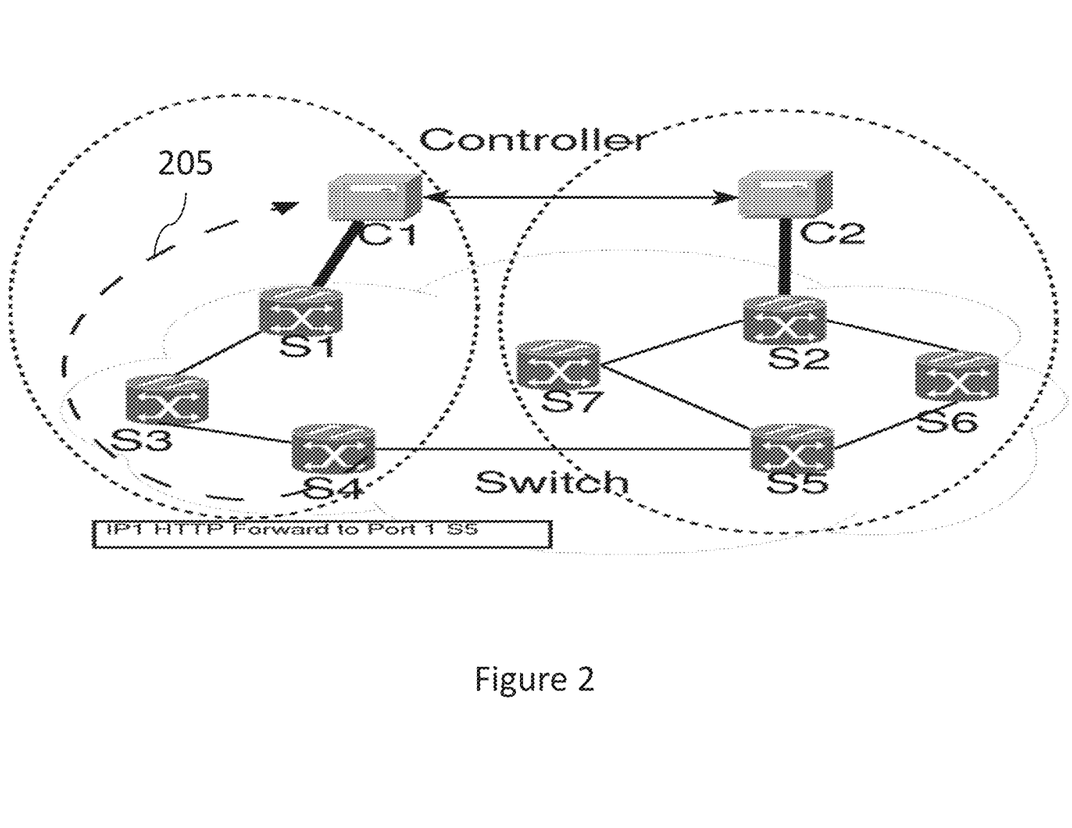
FIG. 2 illustrates a simple network topology, according to one embodiment.

FIG. 2 illustrates a simple network topology. The network topology includes two controllers C1, C2 and a set of switches S1, S2, S3, S4, S5, S6, S7. In this example, when switch S4 receives a new flow without knowing where to send the packet, S4 forwards the packet to the controller C1 as shown by dashed line 205. Upon receiving the packet, controller C1 programs a new routing entry on S4.

Figure 3:
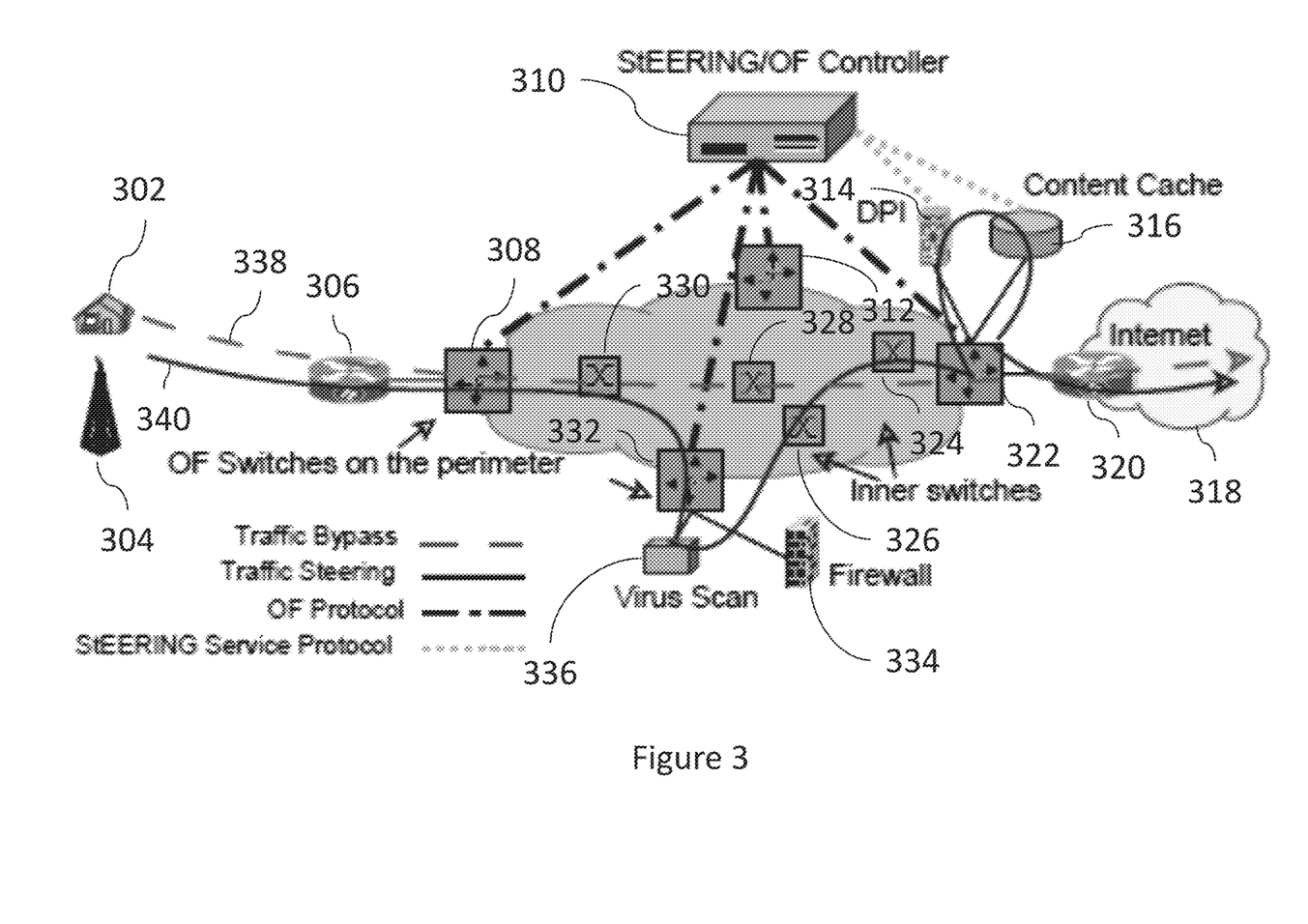
FIG. 3 illustrates a system for implementing SDN inline services and forwarding, according to one embodiment.

FIG. 3 illustrates an example system for implementing SDN inline services and forwarding. Services 314, 316, 334, 336 are provided to subscribers 302, 304 using a plurality of perimeter switches 306, 312, 322, 332 and inner switches 324, 326, 328, 330. A logically centralized controller 310 is used to manage switches and middleboxes, e.g., services. In one embodiment, the logically centralized controller is an Open Flow-based controller. In FIG. 3, two different service paths are shown. Service paths are set based on the subscriber, the application, and the required service order. Service paths are unidirectional, that is, different service paths are specified for upstream and downstream traffic. Service path 340 shows upstream traffic through Virus Scan 336, DPI 314 and Content Cache 316 before entering Internet 318 through perimeter switch 320. Service path 338 bypasses all of the services.

SDN inline services and forwarding architecture uses two different types of switches. The Perimeter Open Flow (OF) Switches 306, 312, 322, 332 are placed on the perimeter of the service delivery network. These switches classify the incoming traffic and steer this traffic towards the next service in the chain. OF switches 306, 312, 322, 332 are the switches to which services or gateway nodes are connected. The Inner Switches 324, 326, 328, 330 forward the traffic using efficient Layer 2 (L2) switching. Inner switches 324, 326, 328, 330 are only connected to other switches. Inner switches 324, 326, 328, 330 may or may not be OF switches.

Traffic steering is a two-step process. The first step classifies incoming packets and assigns them a service path based on predefined subscriber, application, and ordering policies. The second step forwards packets to a next service based on its current position along its assigned service path. This two-step traffic steering process only needs to be performed once between any two border routers, regardless of the number of switches that connects them.

As stated previously, the problem addressed by the present disclosure is the placement of the inline services. A solution for optimally placing services (middleboxes) in the network according to the subscriber's specified traversing orders is provided. The goal is to minimize the average time it takes for the subscribers' traffic to traverse the required services.

The present disclosure does not tackle the problem of routing traffic through a network. Instead, the present disclosure focuses on a slightly different problem, i.e., the optimal locations for placing services according to the subscribers' specified traversing orders, e.g., requirements. A method that minimizes the overall latency for all subscribers in the network is disclosed.

Inline service placement is independent of the routing scheme used in the network. In other words, an assumption is made that the delay between any two locations (nodes) in the network is given (i.e., it is an input to the present scheme).

Figure 4:
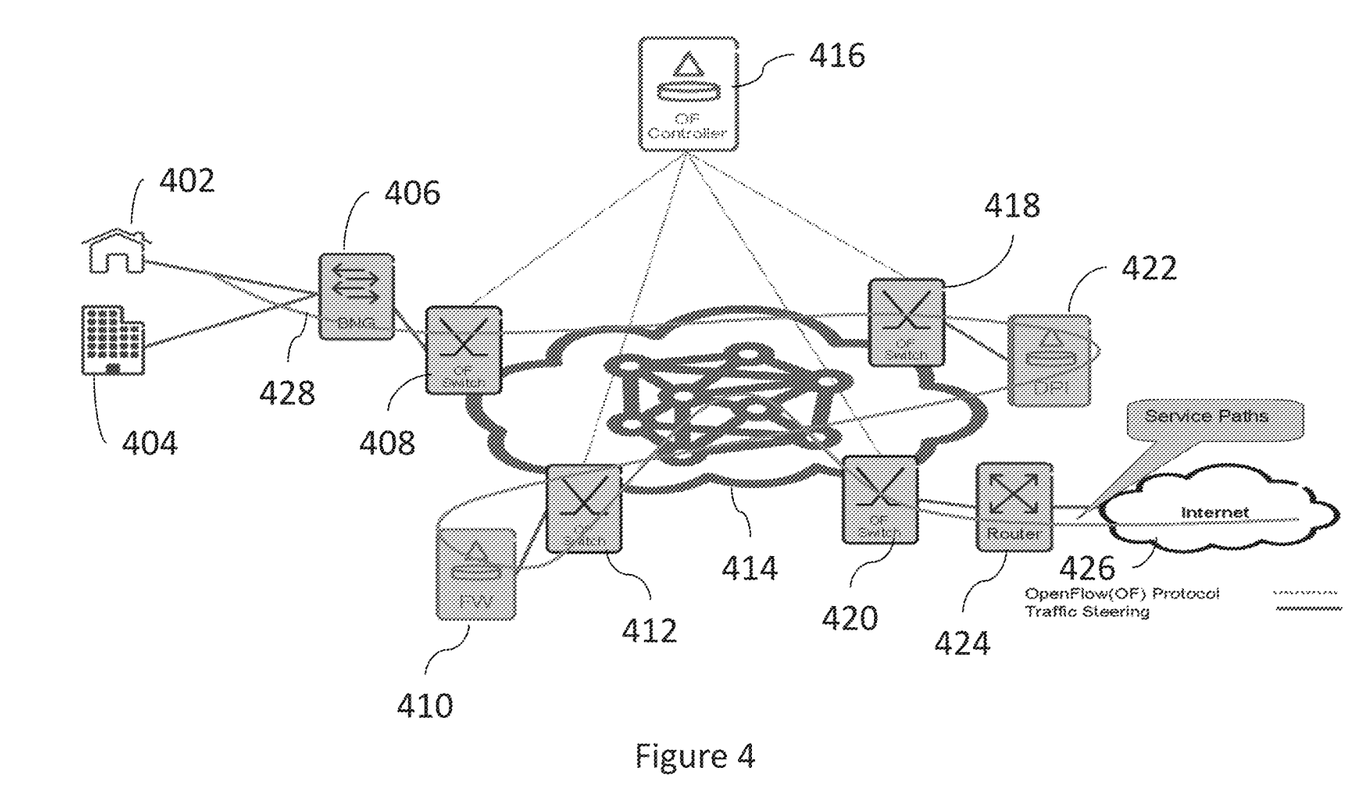
FIG. 4 illustrates a system for implementing SDN inline services and forwarding, according to one embodiment.
Figure 5:
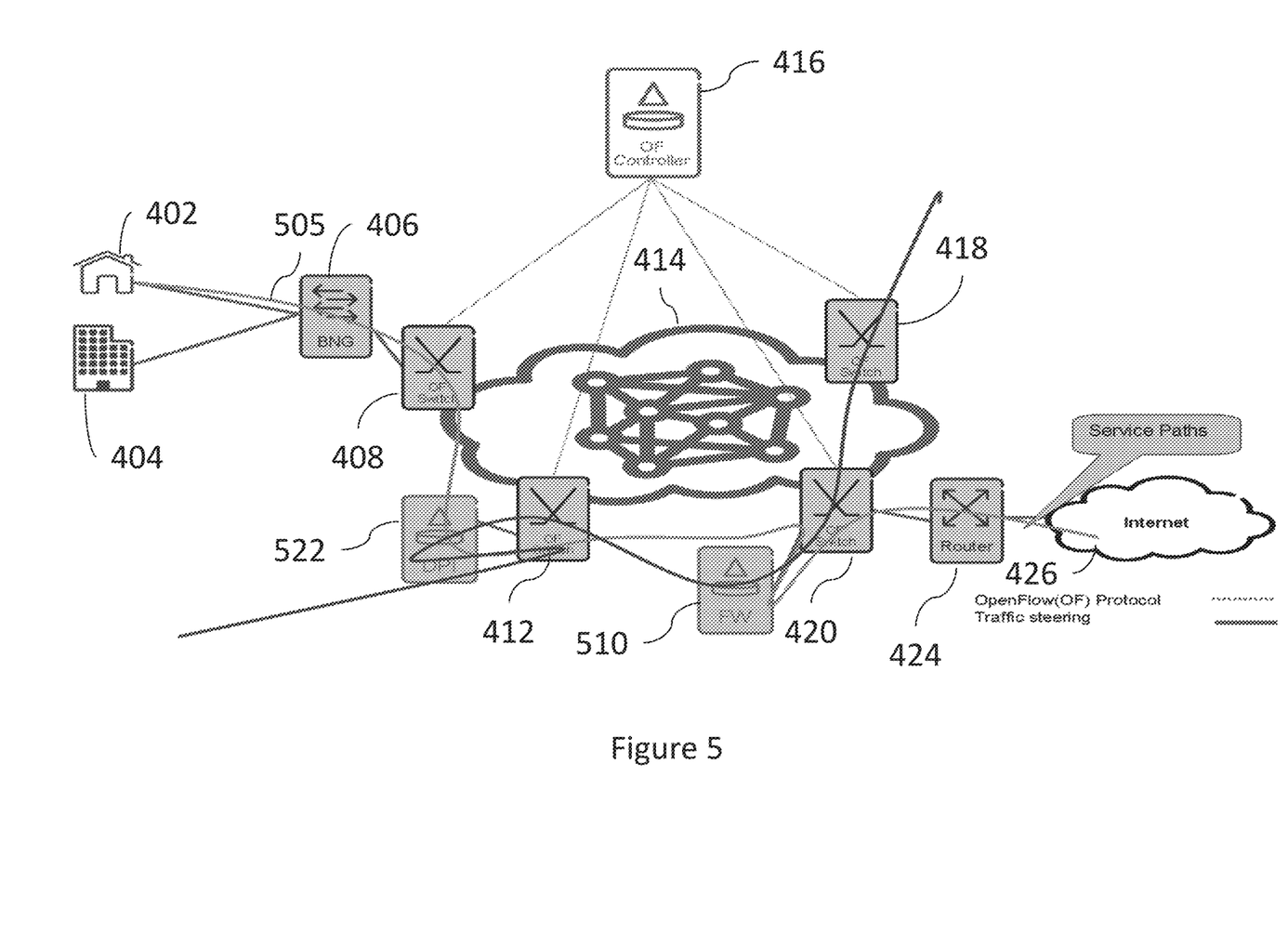
FIG. 5 illustrates a service placement strategy, according to one embodiment.

FIG. 4 and FIG. 5 explain how different placement strategies affect performance.

The need for an intelligent (non-random) service placement scheme is described through the examples of FIG. 4 and FIG. 5. No matter what routing algorithm is used in the network, the unnecessary latency inflation caused by improper service locations still exists.

FIG. 4 illustrates an example system for implementing SDN inline services and forwarding. The system includes subscribers 402, 404, a broadband network gateway (BNG) 406, plurality of services 410, 422, a plurality of OF switches 408, 412, 418, 420, an internal switch network 414, an OF controller 416, and a router 424. Router 424 is connected to Internet 426. In FIG. 4, it is assumed that all traffic enters the network from the BNG 406 and exits the network through the router 424. In this example, 90% of the subscribers require their traffic to first traverse the DPI box 422 and then traverse the firewall (FW) 410. This service order is specified in the subscribers' service contract. The remaining 10% of traffic requires going through FW 410 first before DPI 422. In this case, the majority of traffic needs to first go through the network to reach the DPI box 422, and then go all the way through the network again to reach the FW 410, and finally, to reach the outbound router 424.

The SDN inline services and forwarding solution uses shortest path routing to compute the path between any two end points in the network. However, the ordering of the inline services to be traversed is determined according to subscribers' policies. Therefore, the SDN inline services and forwarding scheme will first compute the shortest path between the ingress 408 and the DPI 422, route the traffic to the DPI 422, and compute the shortest path between the DPI 422 and the FW 410, and finally send the traffic on the shortest path between the FW 410 and the outbound router 424. This inefficient routing, i.e., service path 428, is caused by the services being deployed in non-optimized locations.

FIG. 5 shows a better service placement strategy, which moves the DPI closer to the ingress and the FW after the DPI. Therefore, the majority of the flows take a shorter path. In this example, service path 505 traverses ingress 408. The traffic is then routed to DPI 522 through OF switch 412. From DPI 522, traffic is then routed to FW 510 through OF switch 420. The traffic is then sent to outbound router 424.

The problem of determining the best locations for all the services in a network is not trivial. For example, in the FIG. 5, if there is another ingress point and egress point, and the set of subscribers require a different ordering of the inline services, then the best locations for all the services are not so obvious.

The service placement problem is formulated as a graph problem, i.e., as an optimization problem of minimizing the delay or distance to be traversed for all subscribers' traffic.

For this purpose, the following notation is used. The basic network with OF switches is denoted as $G=(V, E)$. Node set V represents the switches in the network. Edge set E represents the links among the switches. The basic network is represented as an undirected symmetric graph with weighted edges, i.e., if $(u, v) \in E$, then $(v, u) \in E$. Each edge is associated with a delay value $d_{u,v}$. The delay value can simply be $d_{u,v}=d_{v,u}=1$, meaning that the delay is approximated as the hop count.

The set of inline services is denoted as $S=\{s_1, s_2, \ldots s_h\}$, where each element is one type of service to be placed. Each subscriber has its own requirement on the sequence of inline services to traverse. For example, subscriber i's requirement $r_i=$ing, $s_1$, $s_3$, $s_5$, $s_2$, egr. In this example, ing and egr are the ingress and egress locations of the subscribers' traffic. The set of requirements is $R=\{r_1, r_2, \ldots r_k\}$, where there are k subscribers in total.

The objective is to open a subset M ($|M|=|S|=h$) of the locations among all candidates $N=|V|$, and place the services so that the total delay for all of the users is minimized. Given a service placement L, for each service sequence $r_i$, the total delay for traversing all of the services in $r_i$ can be computed. This computation is denoted as:

$$d(r_i)^L = \sum_{(a,b)} \sum_{(u,v) \in path_{a,b}^L} d_{u,v}.$$

Here $d(r_i)^L$ means the delay of service chaining $r_i$ under the solution L. Elements a and b can be any ingress points, egress points, and any service instances. It is a summation over the delay between all the consecutive ingress/egress and services (a, b) in $r_i$. The delay for each consecutive service pair $(s_a, s_b)$ is computed as the sum of all the edges (u, v) in the path between a and b under the solution L($path_{a,b}^L$).

This solution can be formulated as find L to:

$$\text{minimize} \sum_{i=1}^{k} d(r_i)^L.$$

Figure 6:
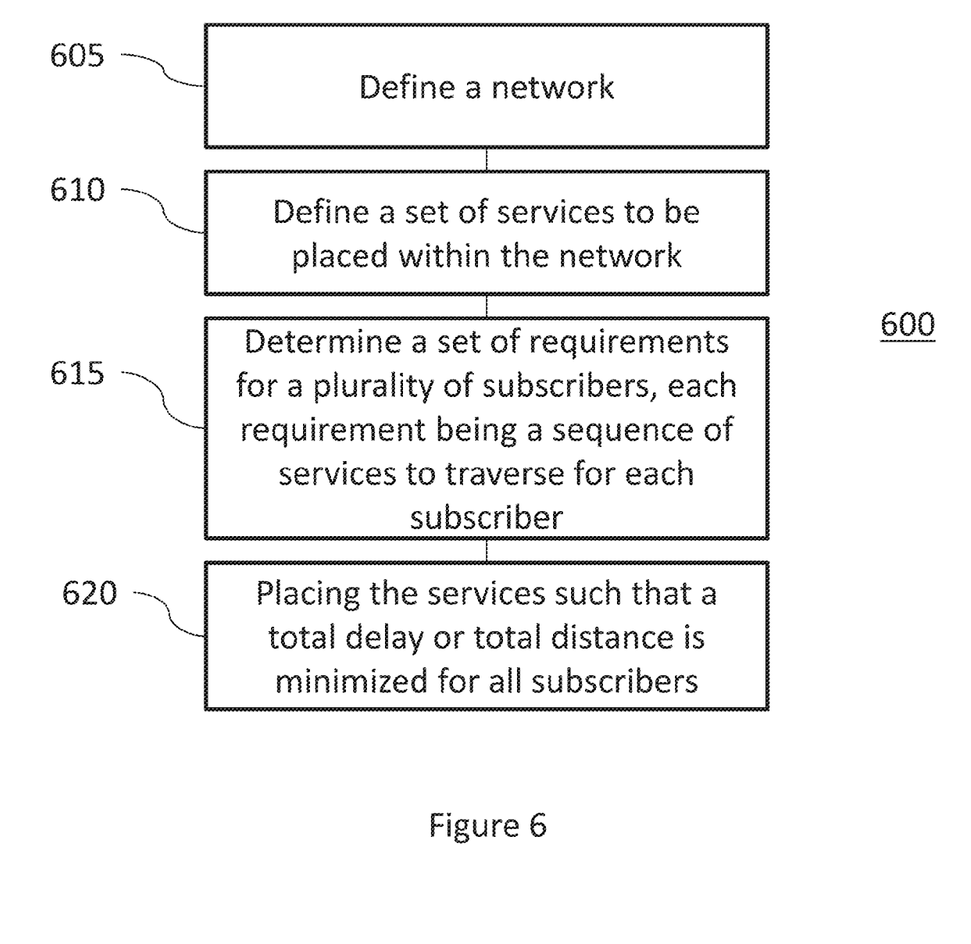
FIG. 6 illustrates a diagram of a method 600 for placing services in a network, according to one embodiment.

A greedy algorithm that minimizes the average latency of paths that subscribers' traffic traverse in the network is described below. FIG. 6 illustrates a diagram of a method 600 for placing services in a network.

At item 605 a network is defined. This network may be controlled by a logically centralized controller, for example, controller 310, 416. At item 610, a set of services to be placed within the network is defined. At item 615, a set of requirements is determined. Each requirement of the set of requirements is a sequence of services to traverse for each subscriber. At step 620, services are placed such that a total delay or total distance is minimized for all subscribers.

Figure 7:
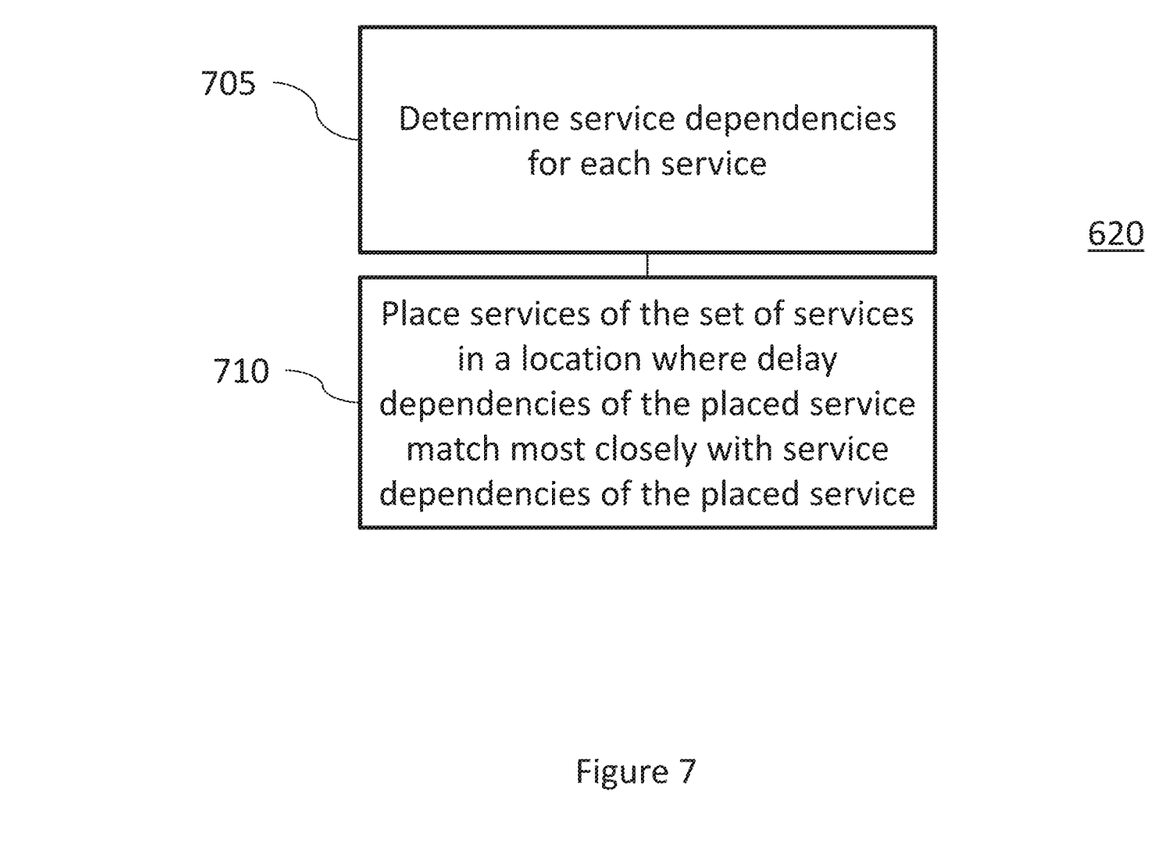
FIG. 7 illustrates a diagram of a method for placing services such that a total delay or total distance is minimized for all subscribers, according to one embodiment.

FIG. 7 illustrates a method for placing services such that a total delay or total distance is minimized for all subscribers. FIG. 7 illustrates item 620 of FIG. 6 in further detail. At item 705 service dependencies are determined for each service. Dependencies between each individual service, other services in the set of services, and all ingress points are determined. The service dependency quantifies how the location of the current service should depend on the location of other entities. The entities that are considered include other services in the set of services, as well as all of the ingress nodes in the defined network.

Dependencies are quantified using a ratio between the current service and any other node (service or ingress). The dependency ratio is computed by factoring the number of subscribers traversing this link, i.e., the link for the current service being placed, over the total in degree of the service. The total in degree of the service is computed as the sum of all subscribers' traffic including the ingress point as well as from all other services.

At item 710, services of the set of services are placed in a location where delay dependencies of the placed service match most closely with service dependencies of the placed service. Each service is placed iteratively based on an income count of each service.

Figure 8:
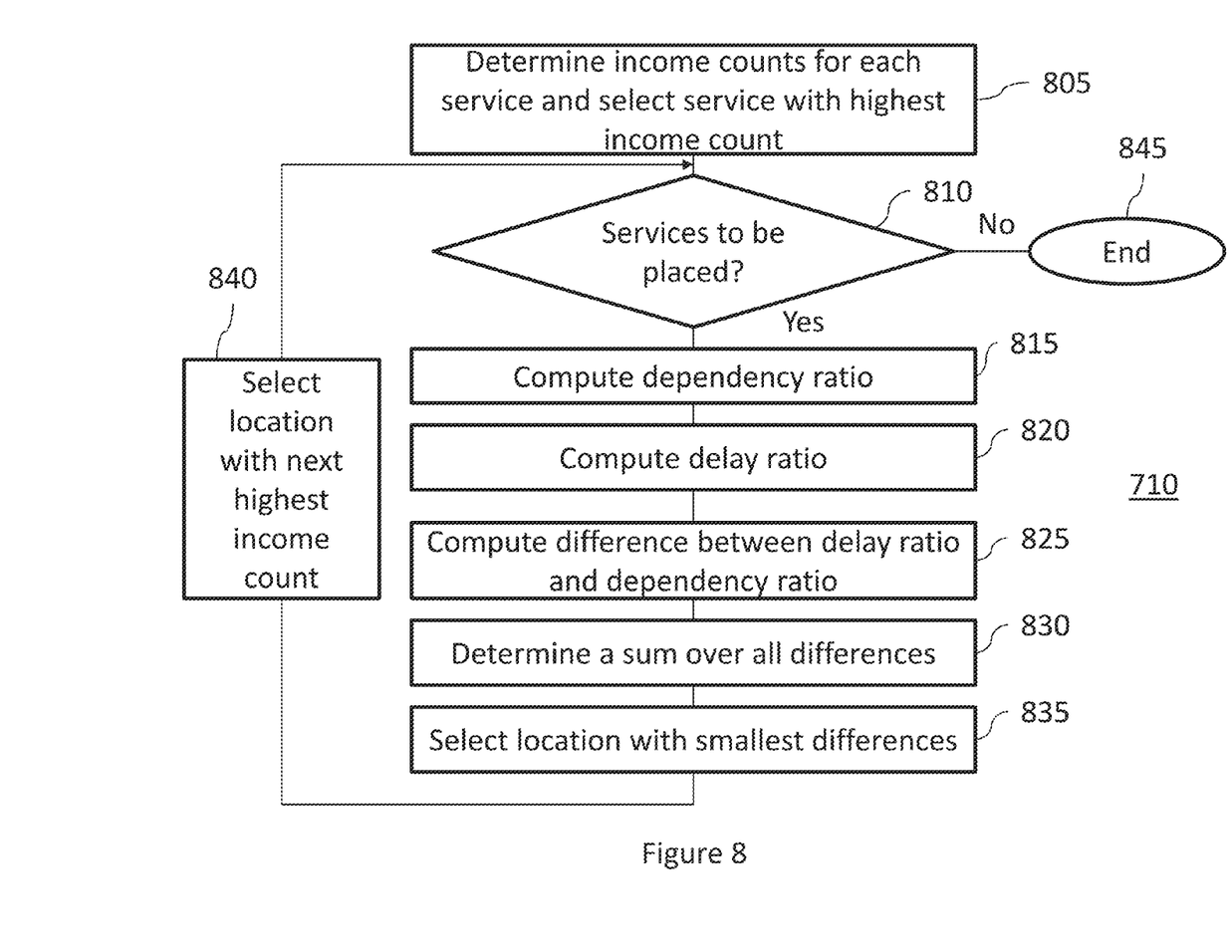
FIG. 8 illustrates a diagram of a method for placing services in a location where delay dependencies match most closely with service dependencies, according to one embodiment.

FIG. 8 illustrates a method for placing services in a location where delay dependencies match most closely with service dependencies. FIG. 8 illustrates item 710 of FIG. 7 in further detail. At item 805, income counts for each service are determined. The subscribers' traffic between services is computed. This computation may be accomplished by using a "count" matrix. The incoming traffic from all ingress nodes is also computed. This may be accomplished using an "income" matrix. The service having the highest income count is selected for placement first.

Item 810 iteratively determines whether there are unplaced services remaining in an unplaced set of services, which is a subset of the set of services. For each iteration, the unplaced service having the largest income count, e.g., the largest number of subscribers traversing the service, is placed. The dependencies (ratios) between the present service being placed and all other services and ingresses are computed. At item 815, the dependency ratio, described above, is computed.

At item 820, a delay ratio is computed. A search is made for all non-occupied locations in the defined network. For each node, the delay ratio is computed between the current node and all other placed services and ingresses. For each location, e.g., node, the delay between the present location and any other allocated service or ingress is computed. Then the ratio of this delay is computed over the sum of all delays. At item 825, for each node pair (the target location examined and other services/ingresses), the difference between the delay ratio and the dependency ratio is computed. At item 830, the sum over all of the differences is taken as the final metric for this location. At item 835, the location with the smallest or least amount of differences is selected. At item 840, the location with the next highest income count is selected and the iterative process begins again at item 810. If there are no further services to be placed, the iterative process ends at item 845.

Figure 9:
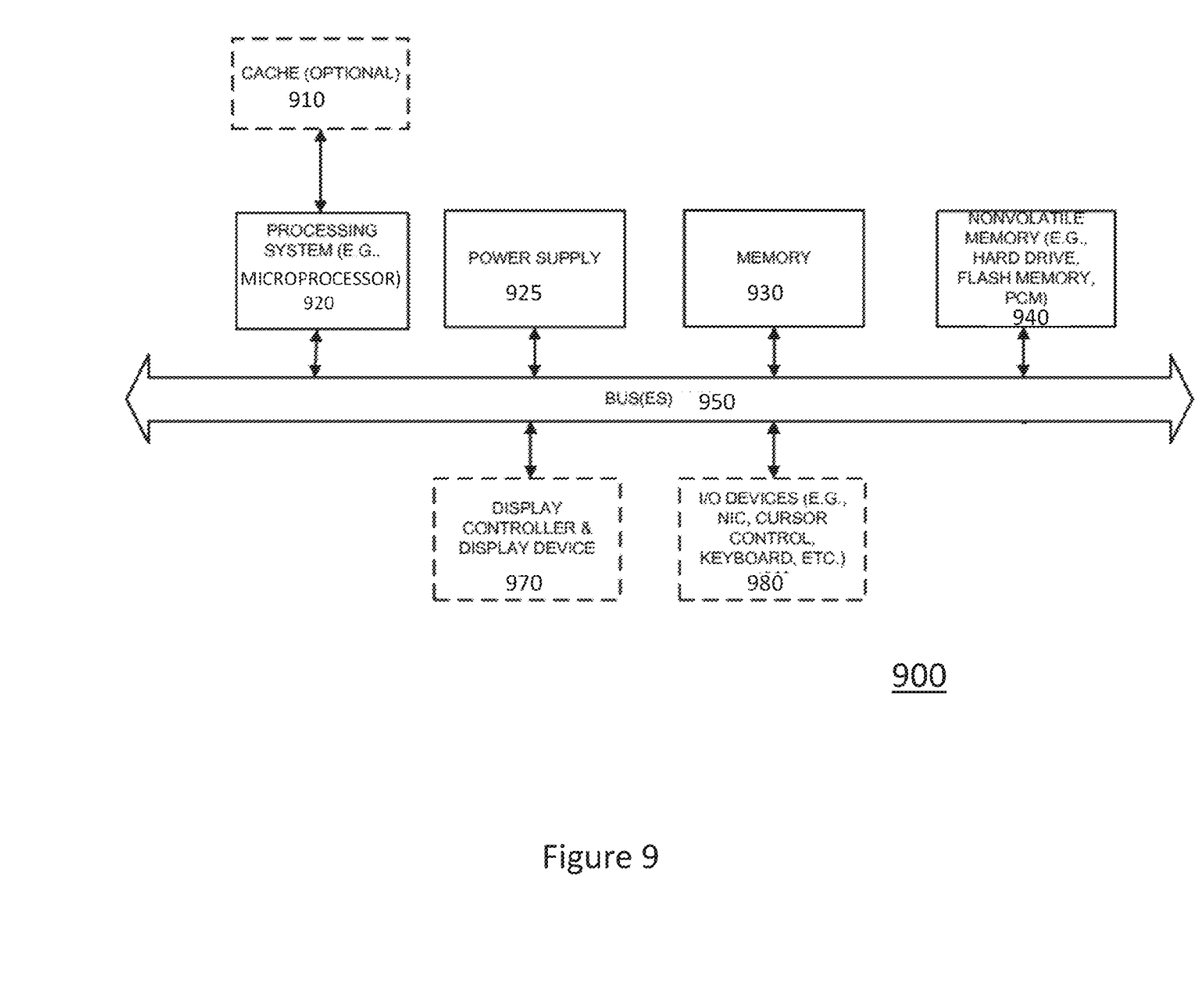
FIG. 9 illustrates a block diagram of an exemplary computer system according to one embodiment.

FIG. 9 illustrates a block diagram of an exemplary computer system according to embodiments of the invention. The exemplary computer system 900 in FIG. 9 can be used to implement controller 310, 416. Those skilled in the art would recognize that other computer systems used to implement this device may have more or less components and may be used in the disclosed embodiments.

The computer system 900 includes a bus(es) 950 that is coupled with a processing system 915, a power supply 920, volatile memory 925 (e.g., double data rate random access memory (DDR-RAM), single data rate (SDR) RAM), non-volatile memory 930 (e.g., hard drive, flash memory, Phase-Change Memory (PCM). The processing system 915 may be further coupled to a processing system cache 910. The processing system 915 may retrieve instruction(s) from the volatile memory 925 and/or the nonvolatile memory 930, and execute the instruction to perform operations described above. The bus(es) 950 couples the above components together and further couples a display controller 970, one or more input/output devices 980 (e.g., a network interface card, a cursor control (e.g., a mouse, trackball, touchscreen, touchpad, etc.), a keyboard, etc.). In one embodiment, the display controller 970 is further coupled to a display device 975.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more buses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for connecting services to a network controlled by a logically centralized controller, which comprises:
   the logically centralized controller:
      defining the network;
      defining a set of services to be connected to the network;
      determining a set of requirements for a plurality of subscribers, each requirement being a sequence of services to traverse for each subscriber;
      connecting each service of the set of services to the network in a respective location such that a total delay or total distance is minimized for all subscribers, wherein the logically centralized controller is further operative for:

determining service dependencies for each service, wherein a service dependency for a current service operating to quantify how placing the current service at a location depends on location of other services in the set of services; and connecting services of the set of services to the network where delay dependencies of a connected service match most closely with the service dependencies of the connected service;

wherein placing each service further comprises:
computing a dependency ratio;
computing a delay ratio;
computing a difference between the delay ratio and the dependency ratio for each location pair;
determining a sum over all differences; and
selecting a location having a least amount of differences.

2. The method of claim 1, wherein the set of services is connected to the network by the logically centralized controller in accordance with a greedy algorithm.

3. The method of claim 1, wherein the logically centralized controller comprises an Open Flow controller.

4. The method of claim 1, wherein dependencies between each individual service, other services in the set of services, and all ingress points are determined.

5. The method of claim 1, wherein determining the service dependencies comprises computing a dependency ratio by factoring a number of subscribers for a link of a service being placed over a total in degree of the service.

6. The method of claim 5, wherein the total in degree of the service is computed as the sum of all subscribers' traffic including an ingress point and all other services in the set of services.

7. The method of claim 1, wherein computing the dependency ratio comprises factoring a number of subscribers for a link of a service being placed over a total in degree of the service.

8. The method of claim 7, wherein the total in degree of the service is computed as the sum of all subscribers' traffic including an ingress point and all other services in the set of services.

9. The method of claim 1, wherein computing the delay ratio further comprises:
searching for all non-occupied locations in the defined network;
computing a delay between a current location and all other placed services and ingresses; and
computing a ratio of the delay over the sum of all delays.

10. An apparatus for connecting services to a network controlled by a logically centralized controller, the apparatus further comprising:

a memory; and a processor coupled to the logically centralized controller, the logically centralized controller configured to:
define the network;
define a set of services to be connected to the network;
determine a set of requirements for a plurality of subscribers, each requirement being a sequence of services to traverse for each subscriber;
connect each service of the set of services to the network in a respective location such that a total delay or total distance is minimized for all subscribers, wherein the logically centralized controller is further configured to:
determine service dependencies for each service, wherein a service dependency for a current service is operative to quantify how placing the current service at a location depends on location of other services in the set of services; and
connect services of the set of services to the network where delay dependencies of a connected service match most closely with the service dependencies of the connected service;

wherein placing each service further comprises:
computing a dependency ratio;
computing a delay ratio;
computing a difference between the delay ratio and the dependency ratio for each location pair;
determining a sum over all differences; and
selecting a location having a least amount of differences.

11. The apparatus of claim 10, wherein the centralized controller comprises an Open Flow controller.

12. The apparatus of claim 10, wherein dependencies between each individual service, other services in the set of services, and all ingress points are determined.

13. The apparatus of claim 10, wherein determining the service dependencies comprises computing a dependency ratio by factoring a number of subscribers for a link of a service being placed over a total in degree of the service.

14. The apparatus of claim 13, wherein the total in degree of the service is computed as the sum of all subscribers' traffic including an ingress point and all other services in the set of services.

* * * * *